Dec. 27, 1938.   H. O. HALVORSON ET AL.   2,141,979
PROCESS FOR TREATING SEWAGE TO PURIFY THE SAME
Filed Sept. 25, 1936   2 Sheets-Sheet 1
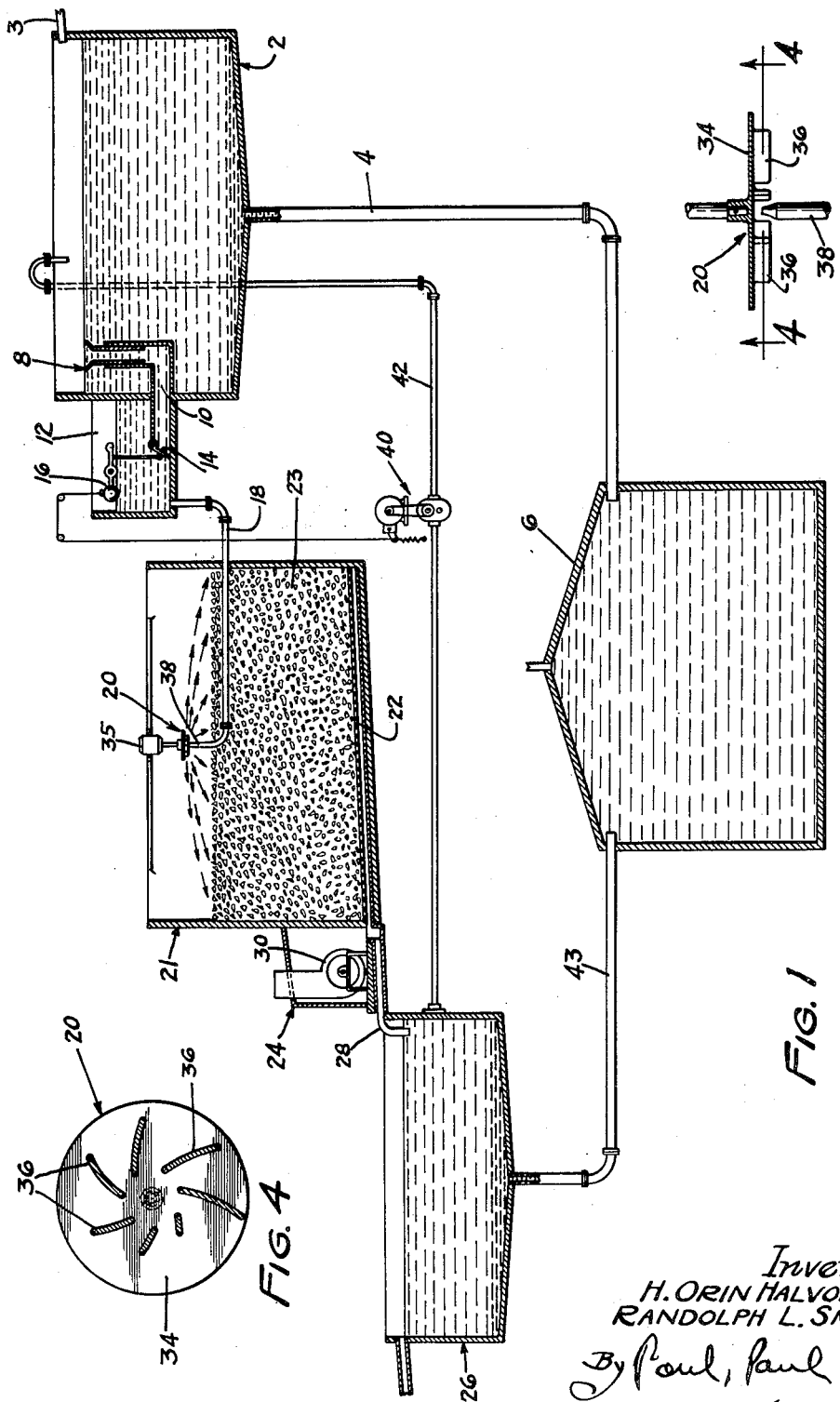
Inventors
H. ORIN HALVORSON
RANDOLPH L. SMITH
By Paul, Paul & Moore
ATTORNEYS Dec. 27, 1938.  H. O. HALVORSON ET AL  2,141,979
PROCESS FOR TREATING SEWAGE TO PURIFY THE SAME
Filed Sept. 25, 1936  2 Sheets—Sheet 2
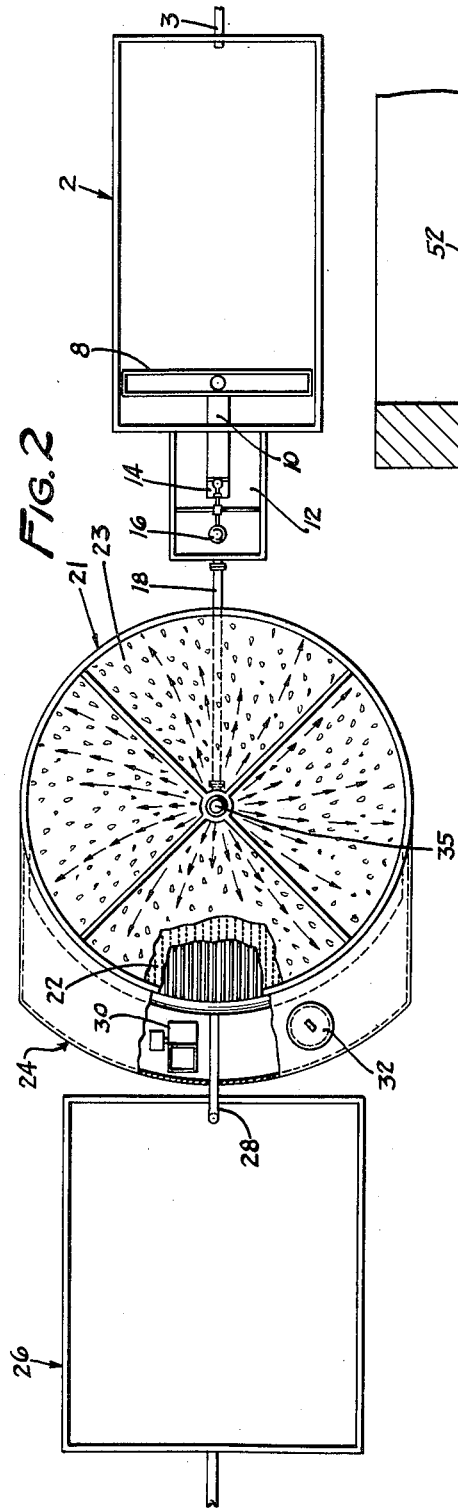
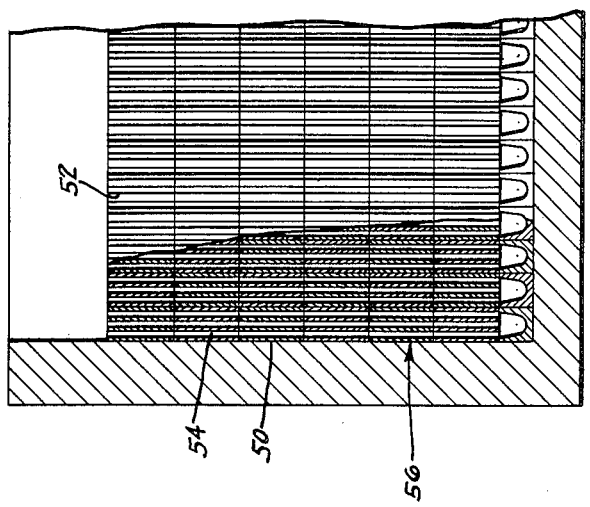
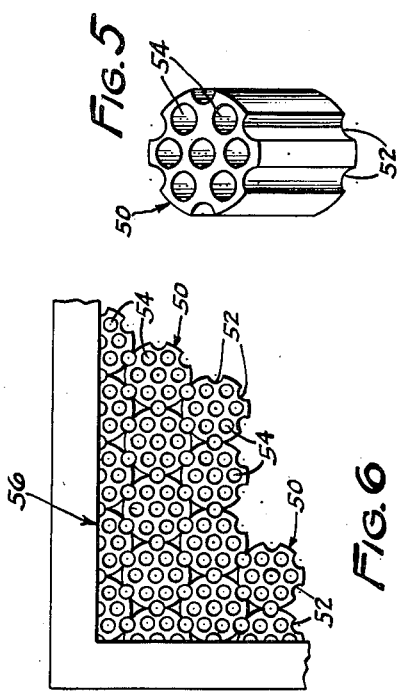
Inventors
H. ORIN HALVORSON
RANDOLPH L. SMITH
By Paul, Paul & Moore
ATTORNEYS Patented Dec. 27, 1938

2,141,979

UNITED STATES PATENT OFFICE 2,141,979

PROCESS FOR TREATING SEWAGE TO PURIFY THE SAME

H. Orin Halvorson and Randolph L. Smith, St. Paul, Minn.

Application September 25, 1936, Serial No. 102,558

11 Claims. (Cl. 210—7)

This is a continuation in part of our application Serial Number 756,866 which was filed on December 10, 1934.

The present invention relates to the treatment of sewage in trickling filters open to atmosphere for the purpose of purification, and has for a broad object the increase of the capacity of the filters.

Again, it is an object of the invention to provide a process for treating sewage in a trickling filter which process greatly increases the capacity of the filter over that under standard present day practice, which results in a high degree of purification of the sewage, and which is moreover simple and inexpensive to operate and requires a minimum of apparatus. Furthermore, it is an object of the invention to provide a process of this character which, when applied to a rock filter, will not cause the same to become clogged or ponded. Also, one of the objects of the invention is the elimination of the filter fly nuisance.

These and numerous other objects of the invention will become readily apparent as the description of the invention proceeds.

Under standard, present day sewage practice, sewage is applied to the filter by either of what are known as the "fixed nozzle" or "rotary" types of distributors, and the filter is operated with rest periods, i. e., time intervals between applications of successive charges of sewage during which the filter is allowed to rest and no sewage is applied thereto.

In the case of the rotary type of distributor, the sewage charge is fed to hollow arms which slowly rotate at a speed of one revolution per minute, hereinafter referred to as R. P. M., for instance, or from two to three R. P. M. as a maximum, over the surface of the filter bed in a horizontal plane and are provided with openings through which the sewage flows down. All portions of the filter bed surface over which the arms pass receive substantially an equal amount of sewage over an extended period of time.

In the fixed nozzle type of distribution, the sewage charge is fed by gravity from a dosing tank to one or more stationary nozzles from which it is radially projected. When the sewage is first applied to the nozzles the hydraulic head of the liquid is at its maximum and the sewage falls over a portion of the filter bed surface constituting an annular ring or band in the center of which the nozzle is located. As the hydraulic head diminishes, the diameter of the core inside the annular ring on which the sewage initially falls also diminishes whereby some sewage is applied to the portion of the bed immediately adjacent the nozzle. In practice, most of the sewage falls in the initial outer annular band. This is shown by the discoloration of such band and has been confirmed by actual measurement. Accordingly all portions of a filter bed surface to which sewage is applied by a fixed nozzle do not receive equal amounts of sewage over an extended period of time.

In both the rotary and fixed nozzle types of distribution, as practiced at present, the sewage is not being distributed uniformly over the entire surface of the filter during any given moment of application, such as a second. The sewage leaving a rotary distributor during the period of a second will be applied to only those portions of the filter bed over which the streams of sewage from the arms passed during that short interval. Again, sewage projected from a fixed nozzle only falls on a limited portion of the filter bed surface during any given momentary period of time, such as a second.

It is usual at the present time to designate the rate of application of sewage to a filter in terms of volume of sewage, per unit of surface area, per day, i. e., millions of gallons per acre, per day, which is abbreviated as m. g. a. d. Because of the fact that sewage is usually not applied at all to some portions of the filter surface, the fact that the sewage is unevenly applied to the effective portions of the filter bed surface during any momentary period, and the fact that the filter is operated with rest periods, under present practice, the expression "millions of gallons, per acre, per day" as commonly used at present refers merely to a daily average rate of application calculated from the total surface area of the filter and the total volume of sewage applied to the filter over a period of twenty-four hours, without any reference to the rate at which the sewage may have been applied to any specified portion of the filter bed surface during any given moment during the day. In order to properly consider the nature of the application of sewage to a filter it is obviously necessary to make a distinction between the daily average rate and the momentary rate of application.

The term "daily average rate of application" as used herein means the quotient obtained by dividing the total amount of sewage applied to the filter bed in the course of one day, by the total top surface area of the filter. References to a daily average rate for any given portion of the filter bed will be understood to mean the quotient obtained by dividing the total amount of sewage applied to such portion in one day, by its area.

The term "maximum momentary rate of application" as used herein means the maximum amount of sewage which a given square foot of filter bed surface receives in the space of any second during a period of normal operation. By the term "mean maximum momentary rate of application" as used herein is meant the sum of the maximum momentary rate for each square foot of the minimum area of the top surface of the filter which receives one-half of the filter load, divided by the number of square feet in said area. In the case of the usual type of fixed nozzle distributor such part may be undivided and will consist of any part of the annular ring and receiving one half of the total amount of sewage applied to the filter in the course of a day. In the case of the usual type of rotary distributor such part may be undivided and will consist of any part under the arms which receives one half of the total amount of sewage applied to the filter in the course of a day. Such part will obviously be divided and consist of separated portions where several distributor units of the type used at present are employed on a single filter.

Thus, in the case of the usual rotary distributor, the daily average rate of application is substantially the same for all portions of the filter bed surface lying beneath the distributor arms. The same is true of the maximum momentary rate of application, whereby the maximum momentary rate of application for each square foot of surface under the distributor arms is substantially equal to the mean maximum momentary rate. Such momentary rate is of course affected by and varies with the number and speed of the distributor arms.

In the case of a fixed nozzle type of distributor, the daily average rate of application for that portion of the filter bed surface which consists of the annular ring upon which the major portion of the sewage falls will be greater than that for the remainder of the active area of the filter, i. e., the central core. Accordingly the mean momentary rate of application for the filter will be greater than the maximum momentary rate for any square foot of surface in the central core inside the annular ring.

The divergence between the mean maximum momentary rate of application for a filter and its daily average rate of application, varies with a number of factors including variations in the duration and number of rest periods and variations in unevenness of application of the sewage to the filter. Accordingly the ratio of (a) what the daily average rate of application would be if sewage were applied to the entire surface of the filter at the mean maximum momentary rate of application continuously for twenty-four hours, to (b) what the daily average rate of application actually is, is very important in considering the manner of application of sewage to the filter. Such ratio will hereinafter be referred to as the "distribution ratio".

Close observation and study of a large number of representative types of apparatus for applying sewage to trickling filters and of numerous trickling filter sewage disposal plants in actual operation, together with an exhaustive review of the literature, disclose that the minimum distribution ratio at which sewage is at present and has been applied to trickling filters, is substantially twenty-five to one. In practice, the maximum distribution ratio runs up to several hundred to one and the average is approximately one hundred to one. Such study has further revealed that sewage is ordinarily applied to trickling filters at daily average rates of from one million to four million gallons per acre per day.

It has heretofore been thought that sewage should not be applied to trickling filters at any daily average rates exceeding four million gallons per acre per day because of the erroneous belief that insufficient reduction in sewage strength is obtainable at higher daily average rates, and that ponding at all the higher rates is inevitable. Attempts have heretofore been made to operate trickling filters at daily average rates of up to seven million gallons per acre per day and the result of attempts to operate filters at daily average rates of from four to seven m. g. a. d. has been that the filters have become ponded.

One discovery upon which the present invention is based is the discovery that a filter influent having a strength at least equivalent to that of undiluted ordinary domestic sewage can be purified to a high degree at daily average rates much in excess of seven m. g. a. d., with only a single passage of the filter influent through a filter of standard depth, provided that the distribution ratio at which the filter influent is applied to the filter is sufficiently low. The present invention further rests upon the discovery that although considerable ponding difficulties are encountered when a rock filter is operated at daily average rates of substantially from four to ten m. g. a. d., these difficulties are minimized and practically eliminated when the daily average rate is increased to a point above this range.

The term "primary influent" is used herein to mean undiluted raw sewage either with or without primary treatment to remove settleable solids. The term "filter influent" as used herein means the sewage liquid which is actually applied to the filter bed and may be either diluted or undiluted primary influent.

The term "sewage" as used herein means either domestic or industrial waste. By "ordinary domestic sewage" is meant domestic waste having a composite strength in the range of substantially from one hundred B. O. D. to seven hundred B. O. D. As is well known the strength of the sewage is ordinarily reduced approximately twenty-five per cent upon subjection to a primary settling treatment for the removal of settleable solids. Accordingly the strength of ordinary domestic sewage following subjection to primary settling treatment ranges substantially from seventy-five B. O. D. to five hundred B. O. D. The term "B. O. D." as used herein means five day biochemical oxygen demand expressed in parts per million as used in standard practice.

Investigation and study have revealed that filters which are in the process of becoming ponded may and often do actually effect a satisfactory degree of reduction in sewage strength. Ponding and purification are not dependent factors, and the fact that a filter becomes ponded is not an indication that the filter is unable to purify sewage at the rates at which the ponding occurs.

The factors causing ponding are complex. Ponding is influenced by the daily average rate of application of the filter influent to the filter, the distribution ratio at which it is applied, and the presence of adequate aeration. The latter is, in turn, influenced by the two former. We have found that although purification and ponding are not dependent upon each other, both are influenced by the daily average rates of flow, the distribution ratios at which the filters are operated, and by the existence of adequate aeration in the filter.

In order to obtain proper operation of any kind of trickling filter it is essential that there be a draft of air through the filter at all times. As is well known, all trickling filters are made with openings at both the bottom and the top so that air can naturally pass therethrough if conditions are such as to naturally induce the draft. In the case of rock filters, there will be an adequate natural draft under certain conditions of atmosphere and sewage application. In a filter of the type formed of fabricated units arranged to provide substantially smooth, vertical conduits extending from the top to the bottom of the filter through which the sewage flows and which will be discussed more particularly hereinafter, there is much less resistance to the flow of air than in the case of a rock filter and a natural draft through this type of filter is accordingly less affected by external factors. Among the external factors affecting the amount of natural draft in a filter are the temperature of the atmosphere as compared to the temperature of the liquid in the filter, the humidity of the atmosphere, the rate at which liquid is passing through the filter, and the heat generated in the filter due to bacterial oxidation.

At certain seasons of the year, particularly in spring and fall, when the temperature of the liquid in the filter is apt to closely approximate the temperature of the atmosphere, there is ordinarily very little natural draft through a rock filter, in view of the relatively large draft resistance which is inherent in this type of filter. Accordingly, the present invention contemplates providing rock type filters with means for forcing an air draft therethrough in the spring and fall or at other times when conditions are such that adequate natural draft is not present.

In contra-distinction to prior practice wherein sewage has been applied to the filter bed at daily average rates of from one to four m. g. a. d., and at distribution ratios of around one hundred to one, the present invention contemplates the application of sewage to the filter at daily average rates in excess of ten m. g. a. d., preferably from fifteen to thirty m. g. a. d., and at distribution ratios of less than ten to one. Sewage may be successfully applied at such rates and in such manner to any suitable type of filter without causing the filter to become ponded, and with a high degree of purification, i. e., from 70% to 95% reduction in sewage strength. In the case of a rock filter, it is usually desirable to provide a forced draft for short periods during spring and fall for reasons above stated. In the case of the fabricated type of filter which was briefly referred to above, however, it is usually superfluous to provide any forced draft at any season of the year either for purposes of purification or to prevent ponding, inasmuch as there is adequate natural draft present at all times in that type of filter.

In accordance with the present invention, the ideal distribution ratio at which sewage should be applied is unity. This precise ideal may be unattainable in actual practice and as a practical matter the distribution ratio should preferably be less than five to one. In any event, the distribution ratio should be less than ten to one, as above stated.

The features of applying the sewage to a trickling filter at the high daily average rates and at the low distribution ratios are both very important aspects of the invention.

The application of the sewage at the high daily average rate greatly increases the capacity of any type of filter. It is also an essential factor in avoiding ponding in rock filters. When a rock filter is operated at relatively low daily average rates, there is insufficient flushing action in the filter to remove the bacterial protoplasm substantially prior to the digestion but at the daily average rates coming within the purview of the present invention protoplasm is constantly being removed from the filter substantially prior to any appreciable digestion. Although the bacterial protoplasm is not flushed out of rock filters at daily average rates of application in the range between one and four m. g. a. d., this does not result in ponding because the amounts of sewage being applied and consequently the amounts of protoplasm being formed within the filter are so small that the protoplasm is able to undergo considerable digestion and slough off before the filter becomes ponded. When sewage is applied to rock filters at daily average rates of from four to ten m. g. a. d., there is a sufficient accumulation of protoplasm to clog the filter if it is not removed prior to digestion, and there is insufficient flushing action to remove protoplasm prior to substantial digestion and before the filter clogs up. However, at daily average rates in excess of ten m. g. a. d., especially in the range of from fifteen to thirty m. g. a. d., there is a sufficient volume of sewage passing through the filter to constantly flush out the protoplasm and keep the filter open when there is an adequate draft in the filter.

The application of the sewage to the trickling filter at the low distribution ratio is highly important because of the fact that the lower the distribution ratio, the more nearly every portion of the filter is made to constantly work at high capacity. Again, the lower the distribution ratio is, the thinner will be the film of sewage flowing over the bacterial contact surfaces of the filter whereby maximum purification by bacterial action is obtained. Moreover, the natural draft which is present in any type of filter becomes stronger as the distribution ratio decreases.

The application of sewage to a trickling filter at both the high daily average rate and the low distribution ratio accordingly makes possible the practical operation of trickling filters at much higher capacities than any thought possible heretofore.

The accompanying drawings show illustrative types of apparatus with which the process of the present invention may be carried out.

Referring more particularly to the drawings—

Figure 1 shows a cross-section of a sewage disposal plant embodying a rock trickling filter, and arranged to carry out the present invention;

Figure 2 is a plan view of Figure 1;

Figure 3 is an enlarged detail sectional view showing one form of head for distributing sewage over the filter bed;

Figure 4 is a detail sectional view along the line 4—4 of Figure 3;

Figure 5 shows an illustrative form of fabricated filter unit.

Figure 6 is a partial plan view of a filter bed formed of units of the type shown in Figure 5; and Figure 7 is a partial cross-sectional view showing the filter.

Referring more particularly to Figures 1 and 2, the numeral 2 designates a combination storage and resettling tank into which incoming raw sewage is delivered from a suitable pipe or conduit 3. The solid matter contained in the raw sewage settles to the bottom of the tank 2 and may be removed therefrom by a suitable sludge pump, not shown, or through a drain pipe 4 connected to a suitable digester 6 of the usual and standard type.

A floating weir generally indicated by the numeral 8 is shown provided at one end of the tank 2 and has a pipe 10 connecting it with a dosing chamber 12. A suitable valve 14 is provided at the discharge end of the pipe 10 and is operated by a float 16. The purpose of the float-operated valve 14 is to maintain a constant head in the dosing chamber 12 regardless of the flow of incoming raw sewage into the tank 2 from the pipe 3. These means for providing a constant head in the dosing tank are here shown because of the specific nature of the particular distributor head employed in this illustrative embodiment of the invention. But it will be understood that other types of distributor heads may be used which do not necessitate maintaining the liquid in the dosing tank at any given level, if desired.

The sewage flows from the dosing tank 12 through a pipe 18 to a suitable distributor head generally indicated by the numeral 20 and which is located substantially at the center of the filter tank, generally designated at 21. In Figure 1 the filter tank 21 is shown filled with loose rock 23 and such rock is preferably present at a depth of from six feet to eight feet, which is the standard depth of rock for trickling filters. The rock may be either crushed rock or gravel and of any of the usual sizes as, for example, from one inch to three inch rock. In place of the rock, any other suitable filter medium may be employed such, for example, as a fabricated tile filter medium of the type shown in Figures 5, 6 and 7 and which will be referred to in more detail hereinafter.

As clearly shown in Figure 1, the rock is supported on an under-drain 22 having openings permitting the passage of air and liquid through the filter. This under-drain communicates with a suitable inspection pit, generally designated at 24, and sewage which has trickled through the filter collects in the under-drain, passes through the inspection pit, and flows into a conventional type of final settling tank 26 through a conduit 28. The inspection pit 24 is provided with a suitable suction fan or blower 30 by means of which a draft of air can be forced through the filter medium in the filter tank 21 at times when there is insufficient natural draft as, for instance, for short periods during spring and fall. Also the inspection pit is provided with a manhole 32 which may be opened so as to enable a natural draft through the filter when the fan or blower 30 is not operating to produce a forced draft.

We have found that it is unnecessary and in fact undesirable to operate the filter with rest periods, and the distributor head 20 is thus operated continuously without any rest periods so that sewage is constantly being applied to the surface of the filter media in the filter tank 21. The constant application of sewage to the filter media results in a reduction of the distribution ratio from what it would be with an operation wherein rest periods are provided. And in order to further reduce the distribution ratio, the distributor head 20 is of such character as to equally and uniformly apply sewage to all portions of the filter bed surface during any momentary period, such as a second.

As here shown, the distributor head comprises a disk 34 having a plurality of vanes or blades 36 secured to its bottom surface, which is driven by a suitable electric motor 35. These vanes are preferably spirally shaped, as shown in Figure 4, and vary in length. They cause liquid sewage projected against the surface of the disk 34 from the nozzle 38 of the pipe 18 to be projected outwardly and uniformly over the entire surface of the filter bed, as diagrammatically illustrated in Figure 1. The sewage projected from the distributor head 20 falls evenly over the entire surface of the filter bed in the manner of a rain. Therefore, the distribution ratio at which sewage is constantly applied from the distributor head 20, is practically unity. To enable such a rain-like and uniform application of the sewage to the entire surface of the filter bed in the particular form of distributor shown, the pressure of the liquid leaving the nozzle 38 must be constant, and it is for this reason that the above described means for maintaining the liquid in the dosing tank 12 at constant level are provided.

We have discovered that continuous operation of a filter throughout the entire twenty-four hour period of the day is more conducive to the preservation of the aerobic condition of the filter than conventional operation with rest periods is. It is accordingly preferable to have liquid passing through the filter at all times of the day and night, even during off periods when there is very little flow of incoming raw sewage. In order to maintain a constant liquid flow through the filter and maintain the level of the liquid in dosing tank 12 at the desired point, means are accordingly provided for recirculating effluent from the final settling tank 26 to the primary settling and storage tank 2 whenever the level within the dosing tank falls below the desired value. Any desired means may be provided for recirculating effluent upon the occurrence of this contingency and there is diagrammatically shown in Figure 1 an electrical pump generally designated at 40 which is connected in a conduit 42 connecting the primary and final settling tanks. As diagrammatically shown in the drawings, the switch for energizing the electrical pump 40 has a connection with the float 16 by means of which the motor is energized whenever the liquid level falls to a predetermined point. A suitable spring is provided for opening the switch and deenergizing the pump when the level of the liquid in the dosing tank again rises to the desired level.

Referring now more particularly to Figures 5, 6 and 7, Figure 5 shows a filter unit generally designated at 50 comprising a cylindrical body having its periphery provided with longitudinally extending flutes or grooves 52 and provided with a plurality of longitudinally extending holes 54 having substantially smooth and continuous walls. Such filter unit is preferably formed of vitrified clay which will not adversely affect the growth of bacteria within the filter and which will not be disintegrated within the filter.

The filter units 50 are preferably arranged closely adjacent one another in layers which are in turn superposed one above the other in predetermined arrangement to form a composite filter 56 having substantially vertical conduits provided with substantially smooth continuous walls extending therethrough from the top to the bottom thereof, as clearly shown in Figures 6 and 7. It will be understood that the units 50 may be formed of any suitable material other than vitrified clay, such as glass or other ceramics, for example. Also the units may be of various shapes and sizes in accordance with individual preference of design. The units and their arrangement in the composite filter are such that over twenty square feet and preferably more than thirty-five square feet of bacterial contact surface are provided per cubic foot of composite filter.

As in the case of the rock filter, the fabricated tile filter media is supported on a suitable underdrain which communicates with the atmosphere to enable a natural draft of air through the filter and it may, if desired, also communicate with a fan or blower for mechanically forcing a draft through the filter. The fabricated filter may be used in place of the rock filter of the plant shown in Figure 1 or in any other suitable plant arranged to carry out the invention.

Because of the fact that a fabricated tile filter, as shown in Figures 5, 6 and 7, presents a minimum amount of resistance to flow of air therethrough, in view of its straight vertical passages, it is desirable to use the fabricated filter in place of the ordinary rock filter when dealing with strong sewage which is apt to present more difficulties in respect to ponding and purification than would be the case with ordinary domestic sewage or sewage having an equivalent strength.

When using a rock filter, it is desirable that the filter media within the tank 21 be from six to eight feet deep which is the generally accepted standard depth for rock filters. With certain types of sewage it is possible to operate with a more shallow rock filter, i. e., from four to six feet deep but where this is done the purification obtained usually suffers disproportionately in comparison to the saving gained from the use of the more shallow depth. Again, a rock filter may be operated at greater depths as for instance depths of from eight to ten feet or more but this is not preferable for the reason that increases in the degree of purification usually obtained by using the greater depth are not sufficient to justify the added cost of increasing the depth of the filter.

In the case of the fabricated filter having smooth vertical conduits which provide very little air resistance, there are no definitely defined limits for the depth of the filter and the filter depth may be varied considerably depending upon the strength of the sewage being purified. Preferably, however, the filter is maintained at the standard depth of from six to eight feet and in the event the sewage being handled has a strength above the range of ordinary domestic sewage the incoming raw sewage or primary influent is diluted sufficiently to bring the filter influent to a strength within the range of values for ordinary domestic sewage, i. e., substantially from one hundred B. O. D. to seven hundred B. O. D. But if desired, the fabricated tile filter may, because of its low resistance to air flow, be increased in depth to take care of sewages of high strength. Again sewage of high strength may be passed through a plurality of filters in stages.

Where strong sewage is treated in a single fabricated tile filter of standard depth, i. e., from six to eight feet, the incoming raw sewage or primary influent is preferably diluted to a strength equivalent to that of ordinary domestic sewage by means of effluent from the filter or the final settling tank. In such operation, a suitable pump may be provided for recirculating the effluent to the primary settling or storage tank while some effluent is constantly removed from the final settling tank and released as purified sewage.

In accordance with the present invention, the filter influent is usually passed through the filter, whether rock or fabricated tile, at a daily average rate within the range of from fifteen to thirty m. g. a. d. and preferably at about twenty m. g. a. d. It is possible to reduce the daily average rate of application down to approximately ten m. g. a. d. but this is inadvisable as it results in a situation that only part of the capacity of the filter is used, and moreover, a point is approached at which there is danger of ponding. Again, it is possible to operate the filter at rates greatly in excess of thirty m. g. a. d. but it is desirable to operate at rates lower than about thirty m. g. a. d. especially in cases where the filter influent has a B. O. D. in excess of one hundred B. O. D. At higher daily average rates, the thickness of the film of sewage flowing over the bacterial contact surface in the filter is correspondingly increased and the result is that there is a lower degree of purification obtained. In the case of the fabricated tile filter, this may be counteracted by increasing the depth of the filter but in the case of the rock filter, it is inadvisable to increase the filter depth for the reasons above stated, and the daily average rate is preferably below thirty m. g. a. d. especially in the case of rock filters.

When applying undiluted filter influent under conditions of application herein set forth to a fabricated tile filter of standard six to eight foot depth and providing smooth vertical conduits down which the filter influent flows, a high percentage reduction in sewage strength of the order of from 70% to 95% is obtained even with high strength industrial wastes, such as canning, creamery and packing house wastes approaching strengths as high as three thousand B. O. D. and considerably beyond. However, even a high percentage reduction of the strength of very strong sewage is insufficient to produce an effluent which could safely be released and it is accordingly desirable, when working with strong waste, to either dilute the same and treat it in a standard depth filter, or increase the depth or number of filters, in order to obtain a final effluent of a safe low strength.

Due to the high daily average rates at which the rock filter 23 or the fabricated filter shown in Figure 7 are operated, the bacterial protoplasm will be flushed off from the bacterial contact surfaces prior to digestion and washed into the final settling tank 26 from which this material passes to the conventional digester 6 by means of suitable conduit 43. The protoplasm which collects in the secondary settling tank 26 is partially stabilized but still subject to some decay and this is the reason for transferring it to the final digester 6 in place of releasing it with the discharge from the final settling tank.

Actual tests have indicated that ordinary domestic sewage will have a percentage reduction in B. O. D. of from 70% to 95% upon being passed through either the rock filter 21 or the fabricated tile filter 56 a single time in undiluted form, at a daily average rate of more than ten m. g. a. d. and at a distribution ratio of less than ten to one. Preferably the sewage is applied at a daily average rate of twenty m. g. a. d. and at a distribution ratio of substantially unity. When working with a very weak sewage, it is in some instances feasible to adjust conditions to produce only a 60% percentage reduction in B. O. D. but as a rule the higher reductions should be obtained. In the case of a rock filter the fan or blower 30 is used only in the absence of adequate natural draft, and it is ordinarily never used with the fabricated tile filter.

Sewage of practically any strength will receive a high percentage reduction in B. O. D. upon being passed through the tile filter 56 of standard six to eight foot depth a single time, but it is desirable to dilute the primary influent to the strength of ordinary domestic sewage with filter effluent, in order to insure a discharge from the plant of a safe B. O. D.

Due to the fact that liquid is constantly being applied to the filter 21 or 56 in accordance with the practice outlined above, the presence of filter flies is practically eliminated whereby one of the greatest nuisances inherent in operation of trickling filters, as heretofore practiced, is abated.

It will be understood that the foregoing specific examples of apparatus and of a carrying out of the invention are merely illustrative and that numerous modifications and variations may be made within the scope of the invention, as indicated by the appended claims. For example, in place of using the particular distributor disclosed, any other suitable type of distributor adapted to be used in a process operating with low distribution ratios may be used. A rotary distributor provided with nozzles to give a fan spray and operating at speeds greater than those hitherto used, may be employed, for example. Again, the apparatus for supplying filter influent to the distributor may be of any desired type.

Having now described our invention, what we claim as new and desire to secure by Letters Patent of the United States, is as follows:

1. A process for treating sewage in a trickling filter open to atmosphere to purify the same, which comprises applying filter influent to the filter at a distribution ratio of less than substantially ten to one.

2. A process for treating sewage in a trickling filter open to atmosphere to purify the same, which comprises applying filter influent to the filter at a daily average rate of more than ten m. g. a. d. and at a distribution ratio of less than substantially ten to one.

3. A process for treating sewage in a trickling filter open to atmosphere, which comprises applying filter influent having a strength of more than substantially seventy-five B. O. D. to the filter at a daily average rate of more than ten m. g. a. d. and at a distribution ratio of less than substantially ten to one.

4. A process for treating sewage in a trickling filter open to atmosphere, which comprises applying filter influent having a strength of substantially from seventy-five B. O. D. to five hundred B. O. D. to the filter at a daily average rate of substantially from fifteen m. g. a. d. to thirty m. g. a. d. and at a distribution ratio of less than substantially ten to one.

5. A process for treating sewage to purify the same, which comprises applying filter influent having a strength of substantially from seventy-five B. O. D. to five hundred B. O. D. to a trickling filter open to atmosphere and formed of rock having a depth of substantially from six feet to eight feet, at a daily average rate of more than ten m. g. a. d. and at a distribution ratio of less than substantially ten to one.

6. A process for treating sewage to purify the same, which comprises applying filter influent to a trickling filter open to atmosphere and provided with a plurality of vertical substantially smooth continuous walls extending therethrough from the top to the bottom thereof, at a daily average rate of more than ten m. g. a. d. and at a distribution ratio of substantially less than ten to one.

7. A process for treating sewage in a trickling filter open to atmosphere to purify the same, which comprises applying filter influent to the filter bed at a daily average rate of more than ten m. g. a. d. and at a distribution ratio of less than substantially ten to one, and simultaneously forcing a draft of air through the filter.

8. A process for purifying domestic sewage, which comprises passing substantially undiluted filter influent through a rock trickling filter open to atmosphere a single time and at a daily average rate of more than substantially ten m. g. a. d. and at a distribution ratio of less than substantially ten to one.

9. An industrial sewage purification process for treating wastes of high strength, which comprises diluting the same with effluent from a trickling filter open to atmosphere to form a filter influent, and passing said influent through said filter at a daily average rate of more than substantially ten m. g. a. d. and at a distribution ratio of less than substantially ten to one, said trickling filter being formed with substantially smooth continuous vertical walls extending from substantially the top to the bottom thereof, down which the filter influent flows.

10. A process for treating sewage to purify the same, which comprises passing filter influent through a trickling filter open to atmosphere at a daily average rate of more than ten m. g. a. d. and at a distribution ratio of less than substantially five to one.

11. A process for purifying ordinary domestic sewage having a strength of from substantially one hundred B. O. D. to seven hundred B. O. D., which comprises passing substantially undiluted filter influent through a rock trickling filter open to atmosphere a single time and at a daily average rate of from substantially fifteen m. g. a. d. to thirty m. g. a. d. and at a distribution ratio of less than substantially five to one.

H. ORIN HALVORSON.
RANDOLPH L. SMITH.